(12) United States Patent
Chevallier et al.

(10) Patent No.: US 11,698,567 B2
(45) Date of Patent: Jul. 11, 2023

(54) COLOURED PVB

(71) Applicant: SAINT-GOBAIN GLASS FRANCE, Courbevoie (FR)

(72) Inventors: Théo Chevallier, Paris (FR); Hannah Ray, Minneapolis, MN (US)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 480 days.

(21) Appl. No.: 16/651,120

(22) PCT Filed: Sep. 20, 2018

(86) PCT No.: PCT/FR2018/052295
§ 371 (c)(1),
(2) Date: Mar. 26, 2020

(87) PCT Pub. No.: WO2019/063911
PCT Pub. Date: Apr. 4, 2019

(65) Prior Publication Data
US 2020/0225550 A1 Jul. 16, 2020

(30) Foreign Application Priority Data
Sep. 29, 2017 (FR) .................................. 1759138

(51) Int. Cl.
*G02F 1/163* (2006.01)
*B32B 17/10* (2006.01)
*G02F 1/157* (2006.01)

(52) U.S. Cl.
CPC ........ *G02F 1/163* (2013.01); *B32B 17/10036* (2013.01); *B32B 17/10513* (2013.01); *B32B 17/10651* (2013.01); *B32B 17/10761* (2013.01); *G02F 1/157* (2013.01)

(58) Field of Classification Search
CPC ... G02F 1/163; G02F 1/157; B32B 17/10036; B32B 17/10513; B32B 17/10651; B32B 17/10761
USPC .................................................. 359/265–275
See application file for complete search history.

(56) References Cited

U.S. PATENT DOCUMENTS 5,792,559 A 8/1998 Heithoff et al.
2017/0192257 A1 7/2017 Branda et al.

FOREIGN PATENT DOCUMENTS

WO WO 2012/064510 A1 5/2012

OTHER PUBLICATIONS

International Search Report as issued in International Patent Application No. PCT/FR2018/052295, dated Jan. 18, 2019.

*Primary Examiner* — Tuyen Tra
(74) *Attorney, Agent, or Firm* — Pillsbury Winthrop Shaw Pittman LLP (57) ABSTRACT

A method is directed to modifying the color in transmission of an optical system that incorporates an electrochromic device. Such a modified optical system makes it possible to combine the notions of effectiveness in the chromatic variation on the one hand, and of limitation of losses in light transmission on the other hand.

20 Claims, 4 Drawing Sheets

COLOURED PVB

CROSS-REFERENCE TO RELATED APPLICATIONS

This application is the U.S. National Stage of PCT/FR2018/052295, filed Sep. 20, 2018, which in turn claims priority to French patent application number 1759138 filed Sep. 29, 2017. The content of these applications are incorporated herein by reference in their entireties.

The present invention relates to the field of electrochemical devices with electrically controllable optical and/or energy properties, which devices are commonly referred to as "electrochromic devices". More particularly, the invention relates to optical systems incorporating such electrochromic devices and to the associated manufacturing processes. Lastly, the invention relates to processes for modifying the color of such optical devices.

Electrochromic devices have certain characteristics that can be modified under the effect of a suitable electrical supply, between a clear state and a tinted state; more particularly transmission, absorption, reflection of electromagnetic radiation at certain wavelengths, in particular in the visible and/or in the infrared, or even the scatter of light may be modified. The variation in transmission generally occurs in the optical domain (infrared, visible, ultraviolet) and/or in other domains of the electromagnetic spectrum, and hence such devices are said to have variable optical and/or energy properties, the optical domain not necessarily being the only domain concerned.

From the thermal point of view, glazings the absorption of which in at least one portion of the solar spectrum may be modified allow solar flux into the interior of rooms or passenger compartments/cockpits to be controlled when they are employed as exterior architectural glazings or windows of transportation means such as automobiles, trains, airplanes, etc. and excessive heating thereof in the case of bright sunshine to be avoided.

From the optical point of view, they allow degree of vision to be controlled, this allowing glare to be avoided when they are employed as exterior glazings in the case of bright sunshine. They may also have a particularly advantageous shutter effect, both when they are employed as exterior glazings and when they are used as interior glazings, for example as part of interior partitions between rooms (offices in a building) or to isolate compartments in trains or airplanes for example.

In this context, it is known to employ an optical system incorporating an electrochromic device. Despite their advantageous properties, optical systems provided with electrochromic devices have the drawback of having a residual color in transmission, generally a yellow-green hue when the electrochromic device is in the clear state. This color is mainly due to the residual absorption of the electrochromic device, although other components of the optical system also participate in the absorption of incident light.

To mitigate this drawback, there is described in the prior art, which includes patent document WO2012/064510A1, an optical system equipped with an electrochromic device, wherein a layer of a hue substantially complementary to that of the electrochromic material is added. According to the principle of subtracting synthesis of colors, this layer allows the residual color in transmission of the optical device to be at least partially attenuated or, in other words, neutralized.

However, at least one underlying problem remains: the added attenuating layer generates losses in light transmission that, in certain configurations, may significantly decrease the clearness in transmission of the optical system, on account of the substantial amount of light absorbed by the latter. Such as described above, the ability of such a layer to transmit light is directly related to its absorption spectrum and not necessarily to its color. Thus, although there are an infinity of absorption spectra allowing a given chromaticity in transmission to be obtained, the light-transmission values associated with each of these absorption spectra may differ substantially from one spectrum to the next.

More precisely, the visual appearance of a color is a result of three psychosensorial parameters corresponding to the subjective sensations of hue, saturation and brightness. Hue is defined by words such as blue, green, red, etc. Saturation expresses degree of chroma, as opposed to how much white radiation the colored emission contains; the whiter a color appears the lower its saturation. Brightness or lightness is an achromatic factor that is related to the level of the colored stimulus. It varies from a non-dazzling maximum value to the absence of light (black). It is quite easy to understand that by varying these three parameters independently of one another, it is possible to produce any imaginable color sensation. In this context, the various systems for describing a color, for example the CIE 1931 or CIELAB 76 color spaces, are merely different ways of defining the three parameters that describe said color.

Figure 1:
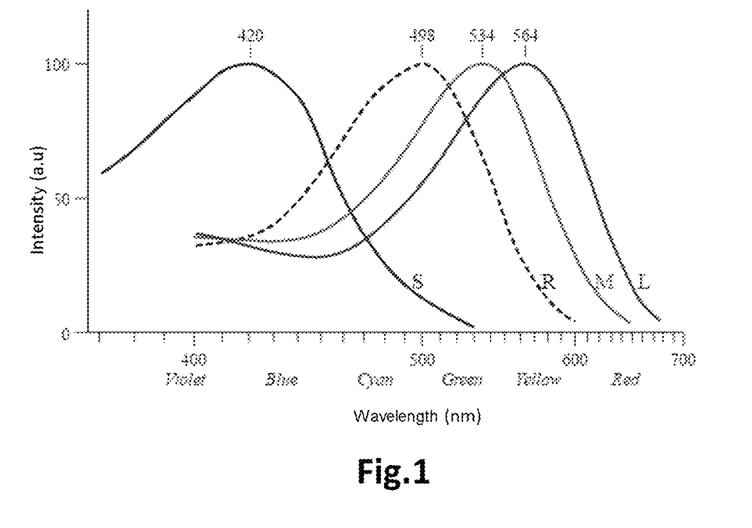
FIG. 1 is a graph illustrating the spectral sensitivity of the photosensitive rods and cones present in a human eye.
Figure 2:
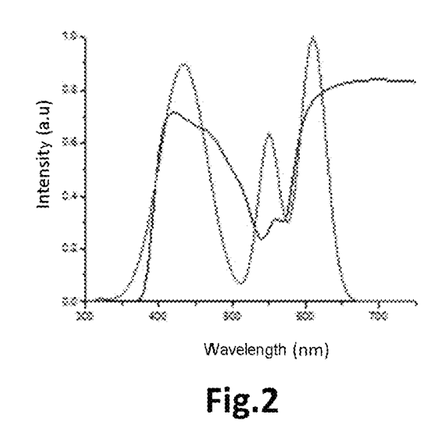
FIG. 2 is a graph showing two absorption spectra allowing a color of given chromaticity in transmission to be obtained.

In the human eye, these color sensations are described by "integral quantities". In this respect, perceived chromaticity, a notion encompassing hue and saturation, is the combination of three signals corresponding to three types of color photoreceptors, i.e. the three types of cones, that are present in the retina. Such as illustrated in FIG. 1, each type of cone has a spectral sensitivity that is specific thereto. The chromaticity of an object may therefore be entirely described via the amount of excitation of each of these cones. The amount of excitation of a cone is the integral of the spectral intensity of the light that reaches it as a function of the spectral sensitivity of the cone. Thus, if the blue cone is twice as sensitive at 420 nm as at 450 nm, then incident light of 1 $mW/cm^2$ at 420 nm creates the same excitation as incident light of 2 $mW/cm^2$ at 450 nm. Provided that the same excitation of the cones is created, the same color is perceived, even if the spectral distribution of the light is different. By way of example, the two spectra shown in FIG. 2 create the same chromatic sensation for a human being, since they cause the same excitation for each cone. For a given color, it is therefore possible to identify an infinity of spectra able to produce it.

Figure 3:
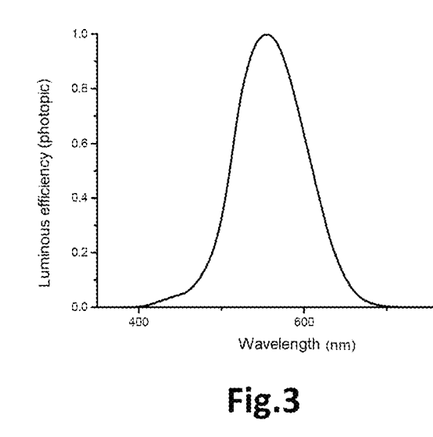
FIG. 3 is a graphical representation of the sensitivity of the human eye as a function of the wavelength of an incident ray.

The same principles apply to the description of the sensation of light intensity. In this case, the photoreceptors called rods also enter into play. An overall sensitivity to light intensity has been determined for an average human eye. Such as illustrated in FIG. 3, the maximum sensitivity of the human eye is obtained for electromagnetic radiation of 550 nm wavelength, this corresponding to the wavelength of the hue "green". In this context, light transmission (TL) denotes the average transmission weighted by a curve of luminous efficiency describing human sensitivity. Light transmission is therefore an integral value measuring transmission as experienced by a human eye, for a given amount of incident light. Such as described in the present text, the value of this light transmission may differ significantly from one absorption spectrum to the next, although these spectra allow the same chromaticity in transmission to be obtained.

In the rest of the text, for the sake of the description, the visual appearance of the color in transmission and the values of light transmission (TL) are measured according to standard NF EN 410, which is commonly used to determine the luminous and solar properties of glazings employed in the construction industry. Alternatively, the data may also be measured according to other known experimental protocols without however departing from the spirit of the invention.

Confronted with substantial losses in light transmission, a person skilled in the art would be incited to decrease the tint percentage of the attenuating layer, in order to maintain the amount of light absorbed by the latter below an acceptable threshold. This partial solution however remains unsatisfactory since it tends to decrease the chromatic attenuation of the optical system, this remaining the effect first sought.

There is therefore a need to provide an optical system incorporating an electrochromic device the color in transmission of which is modified effectively and reliably, while preserving a satisfactory light-transmission value.

The present invention meets this need. More particularly, in at least one embodiment, the proposed technique relates to a process for modifying the color in transmission of an optical system from an initial state having an initial color (L*i; a*i; b*i) to a final state having a final color (L*f; a*f; b*f), said process being characterized in that it comprises at least one step of modifying the absorbance properties of an optical element of said optical system so that at least 50% of the total absorption of this element occurs in an effective absorption range defined so that a variation in absorption by the optical system of any amount of light at a wavelength $\lambda$ comprised in said effective absorption range generates a variation $\Delta C(\lambda)$ in chromaticity distance $(C_i, C(\lambda))$ smaller than 0, where:

$$\Delta C(\lambda) = C(\lambda) - C_i = \sqrt{(a^*(\lambda) - a^*\text{ref})^2 + (b^*(\lambda) - b^*\text{ref})^2} - \sqrt{(a^*i - a^*\text{ref})^2 + (b^*i - b^*\text{ref})^2}$$

($C_i$, $C(\lambda)$) is the chromaticity distance between a given value ((a*i; b*i), (a*($\lambda$); b*($\lambda$))) of chromaticity in transmission and a reference value (a*ref; b*ref) of chromaticity in transmission, (a*i; b*i) is the initial value of chromaticity in transmission, (a*($\lambda$); b*($\lambda$)) is the value of chromaticity in transmission obtained following the variation in absorption achieved at the wavelength $\lambda \in [\lambda_{min}; \lambda_{max}]$.

In the present text, the notion of color encompasses the three psychosensorial parameters employed in the establishment of its visual appearance, namely brightness, hue and saturation, the latter two parameters possibly being grouped together in the notion of chromaticity. The expression "optical element" is understood to mean an element that is at least partially transparent and that is intended to be arranged on the optical path of an incident ray passing through the optical system. This optical system may consist of a succession of transparent sheets of vitrified or plastic material, that include a substrate and a counter substrate. According to particular embodiments, certain of these sheets are separated from each other by a closed space filled with inert gas.

The invention is based on a novel and inventive concept consisting in providing a process allowing the initial color in transmission of an optical system to be modified, while preserving a satisfactory value of light transmission or in other words, clearness.

Concretely, such a process for adapting an optical system to particular transmission conditions may take the form of a process for modifying an already existing optical system, by modifying the absorbance properties of one of its optical elements. It will be noted that this modification of the absorbance properties may be achieved by replacing the targeted optical element, by modifying its intrinsic properties and/or by adding a colored coating. Alternatively, the subject matter of the invention may take the form of a process for manufacturing an optical system in which the absorbance properties of at least one of its optical elements have already been modified, compared to a known prior-art optical system.

A process according to the invention allows the initial color of an optical system to be modified, this initial color having as components an initial lightness and an initial chromaticity, with the objective of obtaining a reference color having, in particular, a reference chromaticity value. The color finally obtained after implementation of the process is called the "final color".

In the present text, the chromaticity distance C is the distance between the chromaticity of the reference color, also called the "objective", and the chromaticity of a color in question, called the "counter-objective", for example the initial color or the color obtained after any variation in the amount of light absorbed at a wavelength $\lambda$. The variation $\Delta C(\lambda)$ in this chromaticity distance generated by this variation in the amount of light absorbed by the optical system at the wavelength $\lambda$ expresses the capacity of the optical system to get closer to the desired chromaticity in transmission, i.e. to the reference chromaticity, by absorbing light at a wavelength $\lambda$. A negative $\Delta C(\lambda)$ value expresses a variation in chromaticity, after absorption of light at a wavelength $\lambda \in [\lambda_{min}; \lambda_{max}]$, allowing the initial chromaticity to be brought closer to the one desired, the obtained chromaticity being "closer" to the desired chromaticity than the initial chromaticity. In contrast, the obtainment of a positive $\Delta C(\lambda)$ value, after absorption of light at a given wavelength $\lambda$ not comprised in $[\lambda_{min}; \lambda_{max}]$, expresses an increase in the distance between the desired chromaticity, i.e. the reference chromaticity, and the initial chromaticity.

A process according to the invention is based on the use of an effective absorption range $[\lambda_{min}; \lambda_{max}]$ defined using the variation $\Delta C(\lambda)$ in chromaticity distances of the optical system, i.e. the variation generated by the variation in absorption, at a wavelength $\lambda$, of any amount of light. More precisely, this effective absorption range $[\lambda_{min}; \lambda_{max}]$ is defined so that $\Delta C(\lambda)$ is lower than 0, and therefore corresponds to an absorption wavelength range in which the variation in color of the optical system corresponds to the sought after effect, at least from a chromatic point of view.

A process according to the invention is in addition based on the notion of total absorption of the optical element in question. This total absorption is an integral value corresponding to the amount of light absorbed by the optical element in question over the entirety of its absorption spectrum. The criterion according to which "at least 50% of the total absorption of the optical element in question is comprised in the effective absorption range" therefore corresponds to a requirement of "color purity", according to which at least 50% of the absorption achieved by the optical element such as modified is dedicated to a chromatic variation tending towards the reference color. It is to be noted that any absorption achieved outside of this effective absorption range will necessarily need to be corrected with the objective of obtaining the desired chromaticity, for example by adding additional filters, this possibly generating additional losses in transmission that it is quite rightly desired to avoid. Taking into consideration the aforementioned criterion therefore makes it possible to combine the notions of effectiveness of the chromatic variation of an optical system on the one hand, and of limitation of losses in light transmission on the other hand.

According to one particular embodiment, said optical system comprises at least one electrochemical functional system with electrically controllable optical and/or energy properties, which preferably comprises at least one ionically conductive layer arranged between a first electrode coating and a second electrode coating, the at least one electrochemically active layer being suitable for passing reversibly between a first state and a second state having optical and/or energy transmission properties different from the first state.

According to one particular embodiment, said ionically conductive layer is said optical element of said optical system the absorbance properties of which are modified.

According to one particular embodiment, said optical system comprises at least the following optical elements:

a functional assembly comprising a substrate of glazing function, on which substrate said electrochemical functional system with electrically controllable optical and/or energy properties is formed, and a lamination interlayer, which is preferably made of polymer and more preferably of PVB, and which is interposed between the functional assembly and a counter-substrate of glazing function.

It is to be noted that the interposition of the lamination interlayer between the functional assembly and the counter-substrate does not necessarily mean that these three elements make direct contact with one another. The term "between" here refers to the order of arrangement of these various optical elements. Thus, the latter may for example be physically separated by one or more layers, for example forming the electrochemical functional system. When used as an exterior glazing, the counter-substrate is intended to be positioned toward the exterior of a building, on the side of the incident solar light.

According to one particular embodiment, said process comprises a step of determining said effective absorption range $[\lambda_{min}; \lambda_{max}]$, preferably using a representation of the chromatic variations $(\Delta a^*(\lambda); \Delta b^*(\lambda))$ in transmission and of the variations $\Delta TL(\lambda)$ in losses in light transmission generated as a function of the wavelength $\lambda$ at which said optical system undergoes a variation in the amount of light absorbed.

According to one particular embodiment, said reference chromaticity value (a*ref; b*ref) has a saturation value of zero.

Such a process aims to decrease the saturation of a color or, in other words, to attenuate it. A point having a saturation value of zero will be grey, white or black, depending on the lightness. In the context of an application to an optical system of glazing function, a zone of zero saturation in transmission has no hue, and therefore the advantage of not adversely affecting the hue of the light rays transmitted from the exterior.

According to one alternative embodiment, the targeted chromaticity value has a non-zero saturation and therefore corresponds to one particular color to be obtained in transmission, whether this be for reasons of technical and/or esthetic nature.

According to one particular embodiment, said optical element is modified so that its absorption spectrum is substantially centered on a wavelength at which the ratio $\Delta C(\lambda)/\Delta TL(\lambda)$ is maximal, where:

$TL(\lambda)$ is the light transmission of said optical system, as determined according to standard NF EN 410, and $\Delta TL(\lambda)$ is the variation in light transmission $TL(\lambda)$ generated by the variation in the amount of light absorbed by the optical system at the wavelength $\lambda$.

The spectral transmittance of the optical system varies with the ratio $\Delta C(\lambda)/\Delta TL(\lambda)$. Thus, assuming that the variation $\Delta TL(\lambda)$ is smaller than 0, the higher the value of $\Delta C(\lambda)/\Delta TL(\lambda)$, the better the system transmits the incident light at an absorption wavelength $\lambda$. In other words, the increase in $\Delta C(\lambda)/\Delta TL(\lambda)$ allows the losses in transmission generated by the optical system to be decreased.

Thus, surprisingly, it has been established that the overall loss in transmission may be minimal for an absorption achieved at an absorption wavelength located in the wavelength range in which the eye is the most sensitive. This result goes against a technical prejudice accepted up to now, namely that it is recommended to avoid absorbing transmitted light in a spectral region in which the human eye is the most sensitive, in order to limit losses $\Delta TL$ in light transmission. Contrary to received ideas, it has therefore been established by the inventors that, with a view to modifying the color in transmission of an optical system while preserving a satisfactory clearness, it is more important to take into account the ratio $\Delta C(\lambda)/\Delta TL(\lambda)$ than to consider in isolation solely the variation in light transmission $TL(\lambda)$ of the system.

According to one particular embodiment, said optical element is modified so that at least 55%, preferably at least 60%, preferably at least 65%, and preferably at least 70% of its total absorption is comprised in said effective absorption range $[\lambda_{min}; \lambda_{max}]$.

An optical system obtained by means of such a process has a higher spectral transmittance, and therefore allows losses in transmission to be decreased.

According to one particular embodiment, the modifying step comprises coloring the bulk of said optical element to be modified and/or depositing a colored coating on at least one of the faces of said optical element to be modified.

According to one particular embodiment, said process comprises at least one preliminary step of measuring the spectrum in transmission of said optical system.

Such a spectrum measurement is for example carried out using a spectrophotometer. On the basis of this measurement, it is possible to determine the initial chromaticity value of the optical system, for example using a color space such as the CIE XYZ (1931) system.

According to one particular embodiment, the invention also relates to an optical system the color of which has been modified by a process such as described above.

According to one particular embodiment, the invention also relates to an optical system comprising:

a first optical element that has what is called an "initial" color (L*i; a*i; b*i) in transmission, a second optical element that is such that the optical system (1) has what is called a "final" color (L*f; a*f; b*f) in transmission, and that is characterized in that at least 50% of the total absorption of this second optical element is comprised in an effective absorption range $[\lambda_{min}; \lambda_{max}]$ defined so that a variation in absorption by the optical system of any amount of light at a wavelength $\lambda$ comprised in said effective absorption range $[\lambda_{min}; \lambda_{max}]$ generates a variation $\Delta C(\lambda)$ in chromaticity distance $(C_i, C(\lambda))$ smaller than 0, where:

$$\Delta C(\lambda) = C(\lambda) - C_i = \sqrt{(a^*(\lambda)-a^*\text{ref})^2 + (b^*(\lambda)-b^*\text{ref})^2} - \sqrt{(a^*i-a^*\text{ref})^2 + (b^*i-b^*\text{ref})^2}$$

$(C_i, C(\lambda))$ is the chromaticity distance between a given value $((a^*i; b^*i), (a^*(\lambda); b^*(\lambda)))$ of chromaticity in transmission and a reference value (a*ref; b*ref) of chromaticity in transmission, (a*i; b*i) is the initial value of chromaticity in transmission, (a*(λ); b*(λ)) is the value of chromaticity in transmission obtained following the variation in absorption achieved at the wavelength λ∈[λ$_{min}$; λ$_{max}$].

According to one particular embodiment, said optical system comprises at least one electrochemical functional system with electrically controllable optical and/or energy properties, which preferably comprises at least one ionically conductive layer arranged between a first electrode coating and a second electrode coating, the at least one electrochemically active layer being suitable for passing reversibly between a first state and a second state having optical and/or energy transmission properties different from the first state.

According to one particular embodiment, said electrochemical functional system with electrically controllable optical and/or energy properties is formed on that face of the substrate which is opposite the lamination interlayer.

According to one particular embodiment, said optical system comprises at least the following optical elements:

a functional assembly comprising a substrate of glazing function, on which substrate an electrochemical functional system with electrically controllable optical and/or energy properties, preferably an electrochromic device, is formed, and a lamination interlayer, which is preferably made of polymer and more preferably of PVB, and which is interposed between the functional assembly and a counter-substrate of glazing function.

According to one particular embodiment, said optical system comprises a reflection-controlling coating, which is preferably made of silicon nitride (SiNx), in order to modify, and preferably attenuate, the color of the optical system in reflection toward one of the sides of said optical system.

The adaptation of the optical system with a view to modifying its color in transmission, or that of a constituent first optical element, generally generates a modification of its color in reflection. The use of a coating for controlling this color in reflection allows the characteristics thereof to be modified, and preferably it to be attenuated, from the point of view of an of the observer positioned opposite the electrochromic system, with respect to said coating.

According to one particular embodiment, said reflection-controlling coating is arranged between said functional assembly and said counter substrate.

Thus arranged, said reflection-controlling coating not only allows the color of the optical system in reflection to be modified from the point of view of an observer positioned on the exterior, but also the amount of exterior light transmitted by the optical system to be increased or, in other words, the overall losses in transmission to be decreased. In this configuration, an interference effect between said optical element suitable for modifying the color in transmission of said optical system and said reflection-controlling coating allows reflection to be decreased, and therefore transmission to be increased, in particular at the wavelengths at which the eye is most sensitive.

The invention also relates to a process for manufacturing an optical system such as described above.

The invention in addition relates to the use of such an optical system as an architectural glazing, in particular an exterior glazing of an internal partition or glazed door, as a glazing in the windows or the internal partitions of transportation means such as trains, airplanes, automobiles, boats and ships, as glazings for display screens such as computer screens or television screens, for spectacles or the objectives of cameras or to protect solar panels.

Other features and advantages of the invention will become apparent on reading the following description of particular embodiments, which are given by way of simple nonlimiting illustrative examples, and the appended figures, in which.

In the various figures, unless otherwise indicated, the same reference numbers have been used to reference elements that are similar or identical.

The various elements illustrated by the figures are not necessarily shown to actual scale, the accent more being placed on the representation of the general operation of the invention.

A plurality of particular embodiments of the invention are described below. It will be understood that the present invention is in no way limited by these particular embodiments and that other embodiments may perfectly well be implemented.

Figure 4:
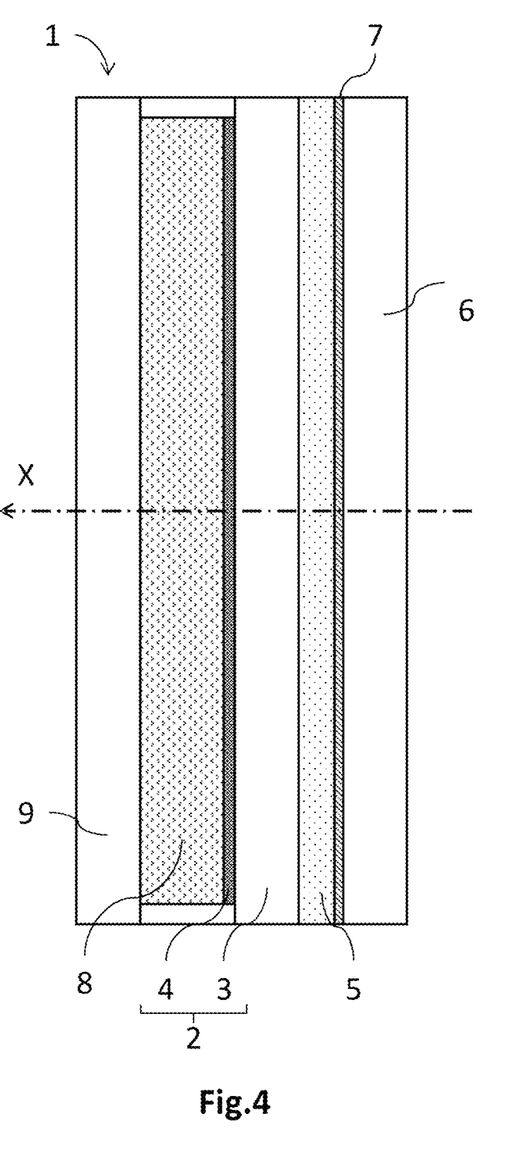
FIG. 4 is a schematic view in cross section of an optical system according to one particular embodiment of the invention.

According to one particular embodiment and such as illustrated in FIG. 4, the invention relates to an optical system 1 comprising at least the following optical elements:

a functional assembly 2 comprising a substrate 3 of glazing function, on which substrate a functional electrochemical system 4 with electrically controllable optical and/or energy properties is formed, said electrochemical functional system 4 comprising at least one ionically conductive layer arranged between a first electrode coating and a second electrode coating, the least one ionically conductive layer being suitable for reversibly passing between a first state and a second state having different optical and/or energy transmission properties from the first state, and a lamination interlayer 5 made of PVB, interposed between the functional assembly 2 and a counter-substrate 6 of glazing function.

In particular, this optical system 1 comprises:

a first optical element that has what is called an "initial" color (L*i; a*i; b*i) in transmission, a second optical element that is such that the optical system 1 has what is called a "final" color (L*f; a*f; b*f) in transmission, and that is characterized in that at least 50% of the total absorption of this second optical element is comprised in an effective absorption range (λ$_{min}$; λ$_{max}$) defined so that a variation in absorption by the optical system 1 of any amount of light at a wavelength λ comprised in the effective absorption range [$\lambda_{min}$; $\lambda_{max}$] generates a variation ΔC(λ) in chromaticity distance ($C_i$, C(λ)) smaller than 0.

According to this particular embodiment, the electrochemical functional system 4 with electrically controllable optical and/or energy properties is formed on that face of the substrate 3 which is opposite the lamination interlayer 5. According to one alternative embodiment, this functional system may be interposed between the substrate 3 and the lamination interlayer 5.

According to one particular embodiment and such as illustrated in FIG. 4, the optical system 1 comprises a reflection-controlling coating 7 made of silicon nitride (SiNx) and arranged on the internal face of the counter-substrate 6. This coating 7 in particular allows the color in reflection of the optical system 1 to be attenuated from the point of view of an observer positioned on the exterior of a building equipped with such an optical system 1. Such an optical coating furthermore allows the amount of exterior light transmitted by the optical system to be increased or, in other words, the overall losses in transmission to be decreased, such as already described in the present text.

According to alternative embodiments, the optical system 1 may adopt various glazing configurations in which the various optical elements are organized along the optical axis X:

single glazing in which two sheets of glazing function, the substrate 3 and the counter-substrate 6, are laminated into a single glazing: (exterior of a building) counter-substrate 6/lamination interlayer 5/functional assembly 2 comprising the substrate 3 (building interior);

double glazing, shown in FIG. 4, in which two among three sheets of glazing function, the substrate 3 and the counter-substrate 6, are laminated into a laminated glazing: (exterior of a building) counter-substrate 6/lamination interlayer 5/functional assembly 2 comprising the substrate 3/cavity 8 filled with an inert gas/low-E layer/glass sheet 9 (building interior);

triple glazing in which two among four glass sheets, the substrate 3 and the counter-substrate 6, are laminated together: (exterior of a building) counter-substrate 6/lamination interlayer 5/functional assembly 2 comprising the substrate 3/cavity filled with an inert gas/glass sheet/cavity filled with an inert gas/low-E layer/glass sheet (building interior).

Generally, the glazing comprises a laminated glazing. This laminated glazing is intended to be placed on the exterior side of the building. By double glazing what is meant is an assembly of two glazings spaced apart and separated by a gas-filled or vacuum-filled cavity, and by triple glazing what is meant is an assembly of three glazings spaced apart and separated by two respective gas- or vacuum-filled cavities. As described above, at least one of the spaced-apart glazings of a multiple glazing may be laminated. In all these configurations, the counter-substrate 6 is intended to be positioned toward the exterior.

It will be noted that the electrochromic device included in the optical system 1 according to the invention may include one or more transparent conductive coatings such as $SnO_2$:F or ITO and/or one or more networks of conductors such as metal wires. The electrochemically active layer and the one or more layers of electrolyte may take the form of a gel solution and/or of an ionically conductive polymer and/or of one or more mineral layers deposited by magnetron cathode sputtering, CVD or the sol-gel process, without departing from the spirit of the invention.

An optical system 1 according to the invention makes it possible to combine the notions of effectiveness of the chromatic variation on the one hand, and of limitation of losses in light transmission on the other hand. This advantageous optical system 1 may in particular be obtained by implementing a process for modifying its color in transmission, from an initial color (L*i; a*i; b*i) to a final color (L*f; a*f; b*f), such as described in more detail in the rest of the text and illustrated in FIG. 5.

Figure 5:
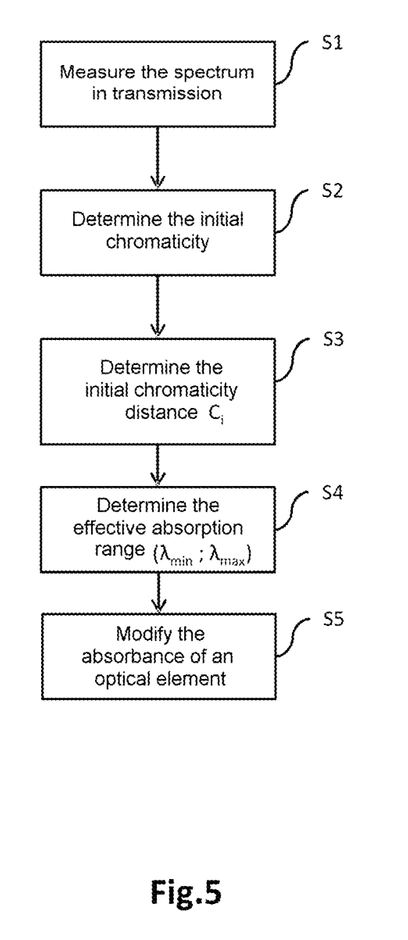
FIG. 5 is a flowchart illustrating the successive steps of a process for modifying the color in transmission of an optical system according to one particular embodiment of the invention.

In a first step (S1), the spectrum in transmission of the optical system 1 is measured using a spectrophotometer or any other known device of equivalent function.

On the basis of this measurement, the initial chromaticity value (a*i; b*i) in transmission of the optical system is determined (step S2), for example using a known color space such as the CIE XYZ (1931) system.

Figure 6:
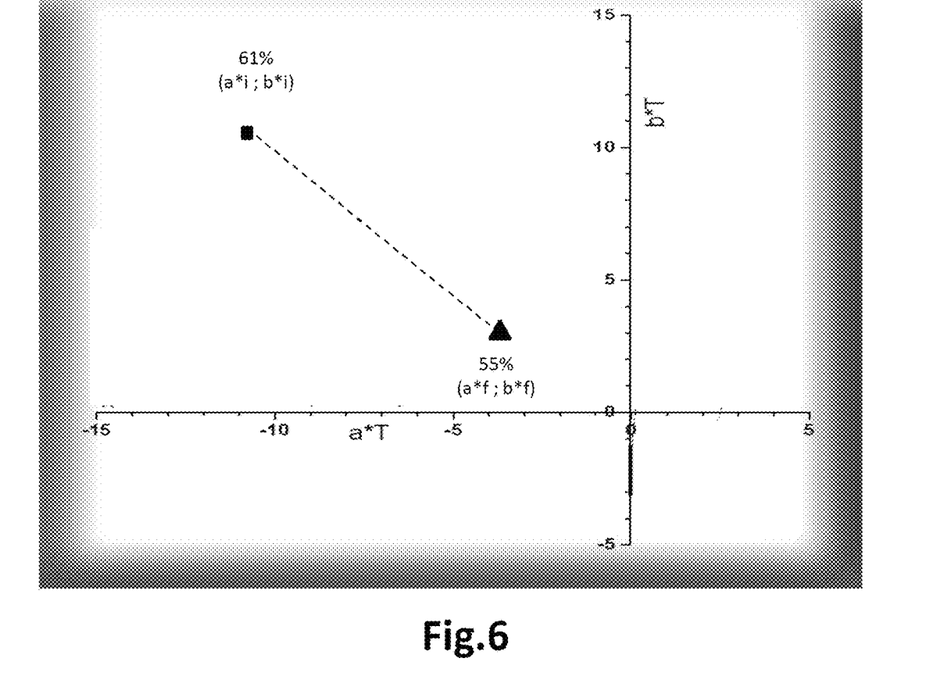
FIG. 6 is a graph illustrating, in a CIE L*a*b* color space, the modification of the color in transmission of an optical system according to one particular embodiment of the invention.

According to one particular embodiment, and such as illustrated in FIG. 6, this initial chromaticity value (a*i; b*i) in transmission is positioned in the known CIE L*a*b* color space, which is commonly called the CIE LAB space, in which:

The L* component is lightness, and is measured from 0 (black) to 100 (white),

The component a* represents a range of 600 levels on an axis extending from the color green (−300) to the color red (+299), The component b* represents a range of 600 levels on an axis extending from the color blue (−300) to the color yellow (+299).

Thus, in the example illustrated in FIG. 6, the value (a*i; b*i), measured in the clear state, of the initial chromaticity in transmission of an optical device (1) is (−10,4805; 10,9183), this corresponding to a yellow-green color. This value is represented by a square. It will be noted that in other embodiments, this initial chromaticity value (a*i; b*i) in transmission may vary over all of the visible spectrum, without departing from the spirit of the invention.

Subsequently, the initial chromaticity distance $C_i$, between this initial chromaticity value (a*i; b*i) in transmission and a given reference chromaticity value (a*ref; b*ref) is determined (step S3). This given reference value relates to a reference color that it is sought to obtain. It differs from the "final color" that is obtained at the end of the modifying process. The initial chromaticity distance $C_i$, corresponds to the norm of the vector extending from the initial chromaticity point (a*i; b*i) to the chosen reference chromaticity point (a*ref; b*ref).

According to the particular embodiment illustrated in FIG. 6, the chosen reference chromaticity value (a*ref; b*ref) is of zero saturation (0; 0). Such a process, commonly referred to as neutralization, aims to attenuate a color in order that it have no hue in transmission other than that of the light rays transmitted from the exterior. With regard to the CIE L*a*b* coordinate system, such a neutralization implies a colorimetric variation toward a color of higher a* component and of lower b* component. According to this embodiment, the initial chromaticity distance $C_i$ satisfies the following equation:

$$C_i = \sqrt{(a^*i)^2 + (b^*i)^2}$$

According to one alternative embodiment, the chosen reference chromaticity value (a*ref; b*ref) has a non-zero saturation and therefore corresponds to a particular color to be obtained in transmission, whether this be for reasons of technical and/or esthetic nature. According to this alternative embodiment, the initial chromaticity distance $C_i$ satisfies the following equation:

$$C_i = \sqrt{(a^*i - a^*\text{ref})^2 + (b^*i - b^*\text{ref})^2}$$

The variation $\Delta C(\lambda)$ in this chromaticity distance between the initial chromaticity value ($a^*i$; $b^*i$) and a chromaticity value ($a^*(\lambda)$; $b^*(\lambda)$) in transmission obtained following a variation in absorption at the wavelength $\lambda$, which value is represented by a triangle, expresses the capacity of the optical system 1 to get closer to the desired chromaticity in transmission, i.e. to the reference chromaticity. Thus, this variation $\Delta C$ satisfies the following equation:

$$\Delta C(\lambda) = C(\lambda) - C_i = \sqrt{(a^*(\lambda) - a^*\text{ref})^2 + (b^*(\lambda) - b^*\text{ref})^2} - \sqrt{(a^*i - a^*\text{ref})^2 + (b^*i - b^*\text{ref})^2}$$

A negative $\Delta C(\lambda)$ value expresses a variation in chromaticity, after absorption of light at a wavelength $\lambda$, allowing the initial chromaticity to be brought closer to the one desired, the obtained chromaticity being "closer" to the desired chromaticity than the initial chromaticity. In contrast, the obtainment of a positive $\Delta C(\lambda)$ value, after absorption of light at a given wavelength $\lambda$, expresses an increase in the distance between the desired chromaticity, i.e. the reference chromaticity, and the initial chromaticity.

Figure 7:
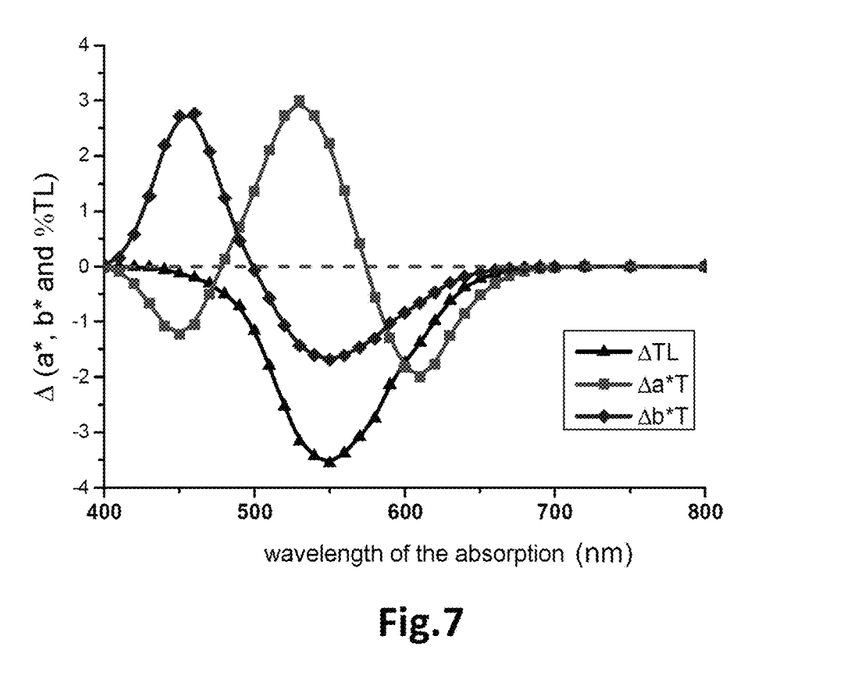
FIG. 7 is a graphical representation of the chromatic variations (Δa*(λ); Δb*(λ)) in transmission and variations ΔTL(λ) in losses in light transmission as a function of the wavelength λ at which an optical system according to one particular embodiment of the invention undergoes a variation in the amount of absorbed light.

FIG. 7 shows three estimated curves of chromatic variations ($\Delta a^*(\lambda)$; $\Delta b^*(\lambda)$) in transmission and of variations $\Delta TL(\lambda)$ in losses in light transmission related to a substantially monochromatic absorption (absorption spectrum full width at half maximum smaller than 5 nm) implemented, for various wavelengths $\lambda$ in all of the optical spectrum, for a known SAGE™ electrochromic double glazing having the following characteristics:

A counter-substrate made of glass of a thickness of 4 mm,
An interlayer made of polymer of a thickness of 0.89 mm,
A substrate made of glass of 2.2 mm thickness, coated with an electrochromic layer,
A cavity filled with argon of 12.2 mm thickness,
A counter-glass of 4 mm thickness.

It will be noted that the choice of a SAGE™ electrochromic double glazing is purely arbitrary. Thus, a graphical representation similar to that of FIG. 7 may be obtained for any given optical system.

To return to the subject of FIG. 7, the estimated curves of the chromatic variations $\Delta a^*(\lambda)$ and $\Delta b^*(\lambda)$ are represented by squares and rhombuses, respectively. The estimated curve of losses $\Delta TL(\lambda)$ in light transmission is represented by triangles and this curve corresponds to the transposition of the curve illustrated in FIG. 3 to the graph of FIG. 7.

With regard to the CIE L*a*b* color space illustrated in FIG. 6, a negative $\Delta a^*$ value bears witness to a chromatic variation toward the green whereas a positive $\Delta a^*$ value refers to a chromatic variation toward the red. Following the same reasoning, a negative $\Delta b^*$ value bears witness to a chromatic variation toward the blue whereas a positive $\Delta a^*$ value refers to a chromatic variation toward the yellow. Following the transposition of this reasoning to the graph of FIG. 7, it may be seen that the chromaticity in transmission tends:

toward the color red in the absorption wavelength range comprised between 480 and 575 nm (positive $\Delta a^*$),
toward the color green in the absorption wavelength ranges respectively comprised between 400 and 480 nm, and between 575 and 800 nm (negative $\Delta a^*$),
toward the color yellow in the absorption wavelength range comprised between 400 and 500 nm (positive $\Delta b^*(\lambda)$),
toward the color blue in the absorption wavelength range comprised between 500 and 800 nm (negative $\Delta b^*(\lambda)$).

The chromatic variations in transmission ($\Delta a^*(\lambda)$; $\Delta b^*(\lambda)$) may respectively be defined using the following equations:

$$\Delta a^*(\lambda) = a^*(\lambda) - a^*i$$

$$\Delta b^*(\lambda) = b^*(\lambda) - b^*i$$

With regard to these two equations, to the aforementioned one defining $\Delta C(\lambda)$, and to the known values of $a^*i$, $a^*\text{ref}$, $b^*i$ and $b^*\text{ref}$, it is easy to calculate the variation $\Delta C(\lambda)$ in chromaticity distance affecting the optical system 1.

In a following step (S4), using FIG. 7 an effective absorption range [$\lambda_{min}$; $\lambda_{max}$] is determined in which a variation in absorption by the optical system (1) of any amount of light at a wavelength $\lambda$ comprised in said effective absorption range [$\lambda_{min}$; $\lambda_{max}$] generates a modification of the initial chromaticity toward the reference chromaticity, or in other words a variation $\Delta C(\lambda)$ in chromaticity distance ($C_i$, $C(\lambda)$), smaller than 0.

With regard to the chromatic variations $\Delta a^*(\lambda)$; $\Delta b^*(\lambda)$) in transmission of an optical device 1 as a function of absorption wavelengths, such as illustrated in FIG. 7, it is determined that the effective absorption range [$\lambda_{min}$; $\lambda_{max}$] meeting this criterion lies approximately between 490 and 588 nm.

According to one particular embodiment, the effective absorption range [$\lambda_{min}$; $\lambda_{max}$] is determined so that the value of the ratio $\Delta C(\lambda)/\Delta TL(\lambda)$ is maximal. The spectral transmittance of the optical system varies with the ratio $\Delta C(\lambda)/\Delta TL(\lambda)$. Thus, assuming that the variation $\Delta TL(\lambda)$ is smaller than 0, the higher the value of $\Delta C(\lambda)/\Delta TL(\lambda)$, the better the transmission of the incident light by the system at an absorption wavelength $\lambda$. In other words, the increase in $\Delta C(\lambda)/\Delta TL(\lambda)$ allows the losses in transmission generated by the optical system to be decreased.

Surprisingly, it has been determined in the case of the example illustrated in FIG. 6, for which example the measured value ($a^*i$; $b^*i$) of initial chromaticity in transmission is (−10,4805; 10,9183), that the value of $\Delta C(\lambda)/\Delta TL(\lambda)$ is maximal at an absorption wavelength of 550 nm. However, this value is located in the wavelength range in which the eye is the most sensitive. This result therefore goes against an established technical prejudice, namely that it is recommended to avoid absorbing transmitted light in a spectral region in which the human eye is the most sensitive, in order to limit losses $\Delta TL(\lambda)$ in light transmission. Contrary to received ideas, it has therefore been established by the inventors that, with a view to modifying the color in transmission of an optical system while preserving a satisfactory clearness, it is more important to take into account the ratio $\Delta C(\lambda)/\Delta TL(\lambda)$ than to consider in isolation the loss $\Delta TL(\lambda)$ in light transmission of the system.

Following the determination of the effective absorption range [$\lambda_{min}$; $\lambda_{max}$] (step S4), the absorbance properties of an optical element of said optical system 1 are modified (step S5) so that at least 50% of the total absorption (A) of this element is achieved in an effective absorption range [$\lambda_{min}$; $\lambda_{max}$] defined so that a variation in absorption by the optical system 1 of any amount of light at a wavelength $\lambda$ comprised in said effective absorption range [$\lambda_{min}$; $\lambda_{max}$] generates a variation $\Delta C(\lambda)$ in chromaticity distance ($C_i$, $C(\lambda)$) smaller than 0.

It will be noted that this modification of the absorbance properties may be achieved by replacing the targeted optical element, by modifying its intrinsic properties and/or by adding a colored coating. Alternatively, the subject matter of the invention may take the form of a process for manufacturing an optical system in which the absorbance properties of one of its optical elements have already been modified, compared to a known prior-art optical system. Thus, according to this particular embodiment, the invention relates to a process for manufacturing an optical system 1 that comprises:

a first optical element that has what is called an "initial" color (L*i; a*i; b*i) in transmission, a second optical element that is such that the optical system 1 has what is called a "final" color (L*f; a*f; b*f) in transmission, and that is characterized in that at least 50% of the total absorption of this second optical element is comprised in an effective absorption range ($\lambda_{min}$; $\lambda_{max}$) defined so that a variation in absorption by the optical system 1 of any amount of light at a wavelength λ comprised in the effective absorption range [$\lambda_{min}$; $\lambda_{max}$] generates a variation ΔC(λ) in chromaticity distance ($C_i$, C(λ)) smaller than 0.

Figure 8:
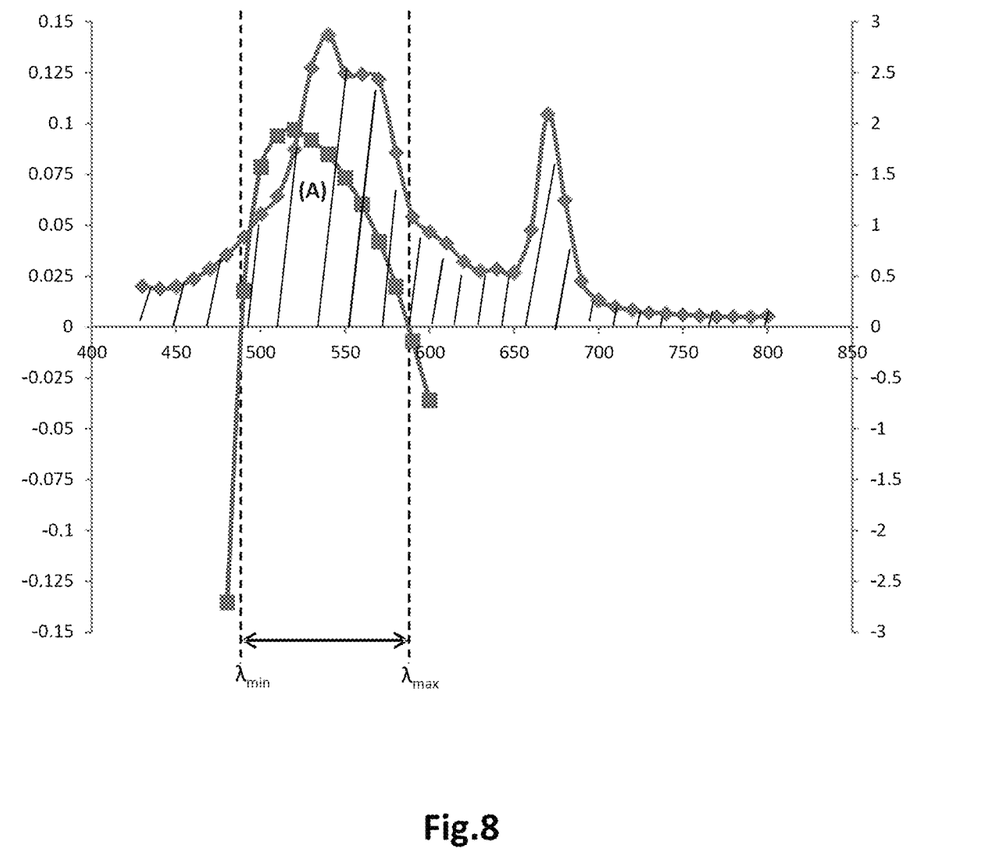
FIG. 8 is a graphical representation of the absorption spectrum of a modified optical device according to one particular embodiment of the invention.

FIG. 8 is a graphical representation of the absorption spectrum (rhombuses) of a SAGE™ optical device 1, such as already described in the present text, in which the bulk of the PVB lamination interlayer 5 has been colored. This graph in addition illustrates the variation in the ratio ΔC(λ)/ΔTL(λ) (curve through the squares) as a function of the absorption wavelength. By tinting the PVB, the absorption spectrum of the optical device 1 has been modified so that at least 58% of the total absorption (A) of this optical element is comprised in the effective absorption range [$\lambda_{min}$; $\lambda_{max}$]. Such as indicated in the present text and illustrated in FIG. 8, this effective absorption range [$\lambda_{min}$; $\lambda_{max}$] lies approximately between 290 and 588 nm.

It will be noted that tinting a PVB so that at least one preset portion of its total absorption (A) is comprised in a preset wavelength range presents no particular technical difficulty, providing of course that these two parameters are judiciously determined/chosen beforehand, this being, inter alia, the crux of the invention.

Alternatively or in combination, the modification (S5) of the absorbance properties of an optical element of the optical system 1 is achieved via the addition, to the material, of semiconductor or metal nanoparticles and/or the deposition of a colored coating on at least one of the faces of the optical element 1 to be modified.

It will be noted that according to particular embodiments, the absorbance properties of one or more elements of the optical system 1 may alternatively or in combination be modified.

Thus, and according to one particular embodiment, the ionically conductive layer integrated into the electrochromic device is or forms part of the optical elements the absorbance properties of which are modified.

In addition, the choice of the desired portion of the total absorption (A) comprised in the effective absorption range [$\lambda_{min}$; $\lambda_{max}$] may differ from one embodiment to the next without however departing from the spirit of the invention.

In order to observe the reproduction of the present invention by an optical system 1 comprising at least one optical element the absorbance properties of which have been modified, it is possible to proceed as follows:

Measure the spectrum in transmission of said modified optical system,

Compare this spectrum to that of said optical device before modification, in order to deduce therefrom the modification parameters of said optical element, namely:
the effective absorption range [$\lambda_{min}$; $\lambda_{max}$] used,
the chosen portion of the total absorption (A) comprised in this effective absorption range [$\lambda_{min}$; $\lambda_{max}$].

It will be noted that the spectrum in transmission of said optical system before modification may already be known, since it is that of a standard optical system, and/or be determinable by replacement of said modified optical element with a standard optical element and subsequent measurement of the spectrum in transmission of the optical system incorporating this standard replacement element. By "standard optical element" what is meant is an optical element having a negligible influence on the obtained spectrum in transmission of the optical system.

The values described in the present text must not be understood as being strictly limited to the mentioned numerical values. Rather, unless otherwise indicated, each value designates both the exactly mentioned value and a range of functionally equivalent values encompassing this value.

Although particular embodiments of the present invention have been illustrated and described, it is obvious that various other changes and modifications may be made within the spirit and scope of the invention. The present text is therefore intended to cover in the appended claims any modification falling within the scope of the present invention.

The invention claimed is:

1. A process for modifying the color in transmission of an optical system from an initial state having an initial color (L*i; a*i; b*i) to a final state having a final color (L*f; a*f; b*f), said process comprising at least one step of modifying the absorbance properties of an optical element of said optical system so that at least 50% of the total absorption (A) of said optical element occurs in an effective absorption range ([$\lambda_{min}$; $\lambda_{max}$]) defined so that a variation in absorption by the optical system of any amount of light at a wavelength λ comprised in said effective absorption range ([$\lambda_{min}$; $\lambda_{max}$]) generates a variation ΔC(λ) in chromaticity distance ($C_i$, C(λ)) smaller than 0, where:

$$\Delta C(\lambda) = C(\lambda) - C_i = \sqrt{(a^*(\lambda) - a^*\text{ref})^2 + (b^*(\lambda) - b^*\text{ref})^2} - \sqrt{(a^*i - a^*\text{ref})^2 + (b^*i - b^*\text{ref})^2}$$

($C_i$, C(λ)) is the chromaticity distance between a given value ((a*i; b*i), (a*(λ); b*(λ))) of chromaticity in transmission and a reference value (a*ref; b*ref) of chromaticity in transmission, (a*i; b*i) is the initial value of chromaticity in transmission, (a*(λ); b*(λ)) is the value of chromaticity in transmission obtained following the variation in absorption achieved at the wavelength λ∈[$\lambda_{min}$; $\lambda_{max}$].

2. The process for modifying the color in transmission of an optical system as claimed in claim 1, wherein said optical system comprises at least one electrochemical functional system with electrically controllable optical and/or energy properties.

3. The process for modifying the color in transmission of an optical system as claimed in claim 2, wherein said at least one electrochemical functional system comprises at least one ionically conductive layer arranged between a first electrode coating and a second electrode coating, the at least one electrochemically active layer being configured to pass reversibly between a first state and a second state having optical and/or energy transmission properties different from the first state.

4. The process for modifying the color in transmission of an optical system as claimed in claim 1, wherein said optical system comprises at least the following optical elements:

a functional assembly comprising a substrate of glazing function, on which substrate said electrochemical functional system with electrically controllable optical and/or energy properties is formed, and a lamination interlayer, which is interposed between the functional assembly and a counter-substrate of glazing function.

5. The process for modifying the color in transmission of an optical system as claimed in claim 4, wherein the lamination interlayer is made of PVB.

6. The process for modifying the color in transmission of an optical system as claimed in claim 1, further comprising a step of determining said effective absorption range ($[\lambda_{min}; \lambda_{max}]$), using a representation of the chromatic variations ($\Delta a^*(\lambda); \Delta b^*(\lambda)$) in transmission and of the variations $\Delta TL(\lambda)$ in losses in light transmission generated as a function of the wavelength $\lambda$ at which said optical system undergoes a variation in the amount of light absorbed.

7. The process for modifying the color in transmission of an optical system as claimed in claim 1, wherein said reference chromaticity value (a*ref; b*ref) has a saturation value of zero.

8. The process for modifying the color in transmission of an optical system as claimed in claim 1, wherein said optical element is modified so that its absorption spectrum is substantially centered on a wavelength at which the ratio $\Delta C(\lambda)/\Delta TL(\lambda)$ is maximal, where:

TL($\lambda$) is the light transmission of said optical system, as determined according to standard NF EN 410, and $\Delta TL(\lambda)$ is the variation in light transmission TL($\lambda$) generated by the variation in the amount of light absorbed by the optical system at the wavelength $\lambda$.

9. The process for modifying the color in transmission of an optical system as claimed in claim 1, wherein said optical element is modified so that at least 55% of its total absorption (A) is comprised in said effective absorption range ($[\lambda_{min}; \lambda_{max}]$).

10. The process for modifying the color in transmission of an optical system as claimed in claim 9, wherein said optical element is modified so that at least 70% of its total absorption (A) is comprised in said effective absorption range ($[\lambda_{min}; \lambda_{max}]$).

11. The process for modifying the color in transmission of an optical system as claimed in claim 1, wherein the modifying step comprises coloring the bulk of said optical element to be modified and/or depositing a colored coating on at least one of the faces of said optical element to be modified.

12. The process for modifying the color in transmission of an optical system as claimed in claim 1, further comprising at least one preliminary step of measuring the spectrum in transmission of said optical system.

13. An optical system the color of which has been modified by a process as claimed in claim 1.

14. The optical system as claimed in claim 13, further comprising the following optical elements:

a functional assembly comprising a substrate of glazing function, on which substrate an electrochemical functional system with electrically controllable optical and/or energy properties is formed, and a lamination interlayer, which is interposed between the functional assembly and a counter-substrate of glazing function.

15. The optical system as claimed in claim 13, further comprising a reflection-controlling coating to modify the color of the optical system in reflection toward one of the sides of said optical system.

16. The optical system as claimed in claim 15, wherein said reflection-controlling coating is arranged between said functional assembly and said counter substrate.

17. The optical system as claimed in claim 15, wherein the reflection-controlling coating is made of silicon nitride (SiNx) in order to attenuate the color of the optical system in reflection toward one of the sides of said optical system.

18. A process for manufacturing an optical system as claimed in claim 13.

19. A method comprising utilizing an optical system as claimed in claim 13 as an architectural glazing, as an exterior glazing of an internal partition or glazed door, as a glazing in windows or internal partitions of transportation means including trains, airplanes, automobiles, boats and ships, as glazings for display screens including computer screens or television screens, for spectacles or objectives of cameras or to protect solar panels.

20. An optical system comprising:

a first optical element that has an initial color (L*i; a*i; b*i) in transmission, a second optical element that is such that the optical system has a final color (L*f; a*f; b*f) in transmission, wherein at least 50% of the total absorption (A) of said second optical element is comprised in an effective absorption range ($[\lambda_{min}; \lambda_{max}]$) defined so that a variation in absorption by the optical system of any amount of light at a wavelength $\lambda$ comprised in said effective absorption range ($[\lambda_{min}; \lambda_{max}]$) generates a variation $\Delta C(\lambda)$ in chromaticity distance ($C_i$, $C(\lambda)$) smaller than 0, where:

$$\Delta C(\lambda) = C(\lambda) - C_i = \sqrt{(a^*(\lambda)-a^*\text{ref})^2 + (b^*(\lambda)-b^*\text{ref})^2} - \sqrt{(a^*i-a^*\text{ref})^2 + (b^*i-b^*\text{ref})^2}$$

($C_i$, $C(\lambda)$) is the chromaticity distance between a given value ((a*i; b*i), (a*($\lambda$); b*($\lambda$))) of chromaticity in transmission and a reference value (a*ref; b*ref) of chromaticity in transmission, (a*i; b*i) is the initial value of chromaticity in transmission, (a*($\lambda$); b*($\lambda$)) is the value of chromaticity in transmission obtained following the variation in absorption achieved at the wavelength $\lambda \in [\lambda_{min}; \lambda_{max}]$.

* * * * *